(12) United States Patent
Schwarz et al.

(10) Patent No.: US 6,349,980 B1
(45) Date of Patent: Feb. 26, 2002

(54) JOINING/CONNECTOR PIECE FOR CORRUGATED PIPES

(75) Inventors: Ernst Schwarz, Volketswil; Ralf Kleeb, Bäretswil, both of (CH)

(73) Assignee: PMA AG, Uster (CH)

( * ) Notice: Subject to any disclaimer, the term of this patent is extended or adjusted under 35 U.S.C. 154(b) by 0 days.

(21) Appl. No.: 09/596,255

(22) PCT Filed: Sep. 27, 1999

(86) PCT No.: PCT/CH99/00455

§ 371 Date: Jun. 16, 2000

§ 102(e) Date: Jun. 16, 2000

(87) PCT Pub. No.: WO00/26570

PCT Pub. Date: May 11, 2000

(30) Foreign Application Priority Data

Oct. 29, 1998 (CH) .............................................. 2186/98

(51) Int. Cl.⁷ ................................................ F16L 19/03
(52) U.S. Cl. ........................ 285/379; 285/903; 285/220; 277/616
(58) Field of Search ................................ 285/379, 380, 285/903, 220, 139.2, 151.1; 277/616, 617, 637, 609

(56) References Cited

U.S. PATENT DOCUMENTS

| | | | | |
|---|---|---|---|---|
| 5,163,721 A | * | 11/1992 | Babuder | 285/379 X |
| 5,176,215 A | * | 1/1993 | Ackerman | 184/1.5 |
| 5,340,170 A | * | 8/1994 | Shinohara et al. | 285/379 |
| 5,366,261 A | * | 11/1994 | Ohmi et al. | 285/328 |
| 5,478,123 A | * | 12/1995 | Kanao | 285/289 |
| 5,950,381 A | * | 9/1999 | Stansbie | 52/220.8 |

FOREIGN PATENT DOCUMENTS

| | | | |
|---|---|---|---|
| DE | 3903780 | * | 8/1990 |
| DE | 19644578 | * | 4/1998 |
| EP | 245233 | * | 11/1987 |
| EP | 499885 | * | 8/1992 |

* cited by examiner

*Primary Examiner*—Teri Pham Luu
(74) *Attorney, Agent, or Firm*—Notaro & Michalos P.C.

(57) ABSTRACT

The connecting element (1) is equipped in the region of a connecting portion (5) with a seal (7) which is fixedly connected with the housing (3) of the connecting element (1). Staying elements (9) protect the seal (7) against undue pressing forces. Between the housing (3) and one end of a corrugated pipe (2) a seal (12) is also disposed, which is nondetachably connected with the inner shell (14) of the housing (3) of the connecting element (1).

5 Claims, 1 Drawing Sheet

JOINING/CONNECTOR PIECE FOR CORRUGATED PIPES

FIELD AND BACKGROUND OF THE INVENTION

The invention relates to a joining and connecting element for corrugated pipes with at least one hollow core space encompassed by a housing for receiving a pipe end, a connecting portion at the end of the housing facing away from the hollow core space, an abutment shoulder, formed on the housing in the region of the connecting portion, with a sealing face, and a sealing configuration.

Joining and connecting elements or connecting fittings of this type are known in various implementations. Swiss Patent CH 645 448 describes, for example, a connecting fitting for a flexible corrugated tube. This connecting fitting comprises a housing with a hollow core space, wherein one end of the corrugated tube or corrugated pipe is slid into this hollow core space. Furthermore, on the housing a recess is provided into which is slid a locking device and by means of which the end of the corrugated tube is retained in the hollow core space. On the end of the housing facing away from the hollow core space is disposed a connecting portion in the form of a threaded stub and on the rear end of this threaded stub the housing comprises an abutment shoulder with a sealing face. This threaded stub serves for connecting the fitting with this housing by threading it into a threaded bore in the wall of a housing or the threaded stub is passed through a bore and subsequently tightened with a nut on the inside. To generate a tight connection between the abutment shoulder on the connecting fitting and the wall of the housing, it is necessary to emplace a seal in a manner known per se. In order to be able to withstand the relatively high screw-in forces, these seals must comprise a material resistant to compression, for example, they must be made of paper-base laminates. Such seals can only even out irregularities in the contact region to a limited extent. They additionally have only a low elasticity or sealing tolerance, such that the sealing effect is lost even if the threaded connection is only slightly released. There also exists the danger that during the assembly of the connecting fitting the seal is not emplaced resulting in serious damages. In a tight implementation of the connection between a corrugated pipe end and the fitting, a seal is also emplaced in the hollow core space disposed between the outer shell of the corrugated pipe and the shell of the hollow core space. This seal is placed either prior to assembly into the hollow core space of the fitting, or it is slid over the end of the corrugated pipe, and the corrugated pipe and the fitting are subsequently plugged together. Again, the danger exists here that this seal is lost, or that, due to improper sliding of the pipe end into the fitting, the seal is deformed and that its effect is thereby impaired.

SUMMARY OF THE INVENTION

It is the task of the invention to provide a joining and connecting element for corrugated pipes in which for tight connections no seals need to be emplaced and in which soft sealing materials can be used as seals, and during assembly, additional emplacements of seals are avoided and the working process is thereby simplified.

This task is solved by the characteristics defined in the characterizing clause of the independent claim. Advantageous further developments of the invention are evident on the basis of the characteristics of the dependent claims.

The tight connection between the seal and the sealing face on the abutment shoulder of the housing provides the advantage that the seal is always positioned at the correct location of the housing and that it cannot be lost. The seal is a structural member of the housing and, thus, of the joining and connecting element, such that when using the joining and connecting element or its threaded connection with, for example, the wall of a housing, a tight connection is always obtained between the joining element and the part with which the corrugated pipe is to be connected. The connecting portion on the housing of the joining element can be a threaded stub with outer threading, or a stub with inner threading, or a flange with fastening screws. In the case of inner threading as well as in the case of outer threading, the abutment shoulder is positioned on the inner end of the threading and is directed radially outwardly or inwardly. In the case of a flange, this flange itself forms the abutment face or sealing face. Staying elements formed on the sealing face and abutment face on the housing lead to the further advantage that the pressing forces applied through the screwing do not need to be absorbed by the seal but are transferred via these staying elements to the abutment shoulder and thus to the housing of the connecting element. This yields a significantly increased range from which the materials for the seal can be selected, such that also soft materials such as, for example, polyester elastomers can be used. Due to the high elasticity of such seals, deviations of form such as, for example, unevenness in the area of the sealing faces and also variations of the pressing forces due to vibrations can be evened out. This leads to substantially greater tightness and higher security of the sealing configuration. In order to be able to utilize the elasticity of the seal in the longitudinal direction of the joining and connecting element, it is proposed to structure the height of the staying elements in the direction of the longitudinal axis of the housing to be less than the thickness of the seal. Simultaneously, the staying elements are in radial direction of a width which is less than the width of the seal, such that a closed sealing ring is provided.

The seal in the hollow core space of the joining and connecting element is also fixedly connected with the housing, such that here also the advantage is obtained that the inner seal is a structural member of the housing and that it cannot be lost. Due to this tight connection along the inner shell of the hollow core space the shape of the seal is also retained, and the seal is not deformed when sliding the pipe end into or out of the hollow core space nor is it moved from its sealing location. In this case also soft sealing materials are preferably used which are suitable for a tight connection with the materials of the housing. This is, for example, also a polyester elastomer.

The tight connection between the seal(s) with the housing is formed by surface bonding [connection] on the contact faces. To this end the housing is produced first, for example by injection molding [casting] of a synthetic material or metal, or of a combination of synthetic material and metal. Herein the same materials are used which are also used, for example, in the known connecting fittings, for example, as the synthetic material a polyamide and as the metal, for example, stainless steel. The seals are formed by way of injection molding onto the prefabricated housing part such that a two-component molded [cast] part is produced and on the contact surfaces between the seals and the housing, a fixed surface connection is provided.

Disposing two pairs of staying elements on the abutment shoulder of the housing is advantageous since, due to the symmetrical distribution at a spacing of 90° each, uniform contact distributed over the circumference results. Two staying elements each are disposed diametrically opposing one another with one pair being disposed on the inner diameter of the abutment shoulder and the second pair on the outer diameter of the abutment shoulder. Therewith good contact is ensured even with deviations developed during shaping.

A joining and connecting element structured according to the invention facilitates handling and assembly, since no auxiliary parts are required in order to establish a tight connection, for example, according to Standard EN 60529, i.e. for water. Even if the locking means which retains the pipe end in the hollow core space of the housing and secures it against being pulled out, is pre-assembled or connected with the housing, a practically unitary joining and connecting element results, which can be assembled without additional structural parts or handling steps in an extremely simple manner. The seals are also not lost during temporary disassembly, and the sealing effect is reliably ensured upon re-assembly.

BRIEF DESCRIPTION OF THE DRAWINGS

In the following, the invention will be explained in further detail in conjunction with an embodiment example and with reference to the enclosed drawings. Therein shown.

DESCRIPTION OF THE PREFERRED EMBODIMENT

Figure 1:
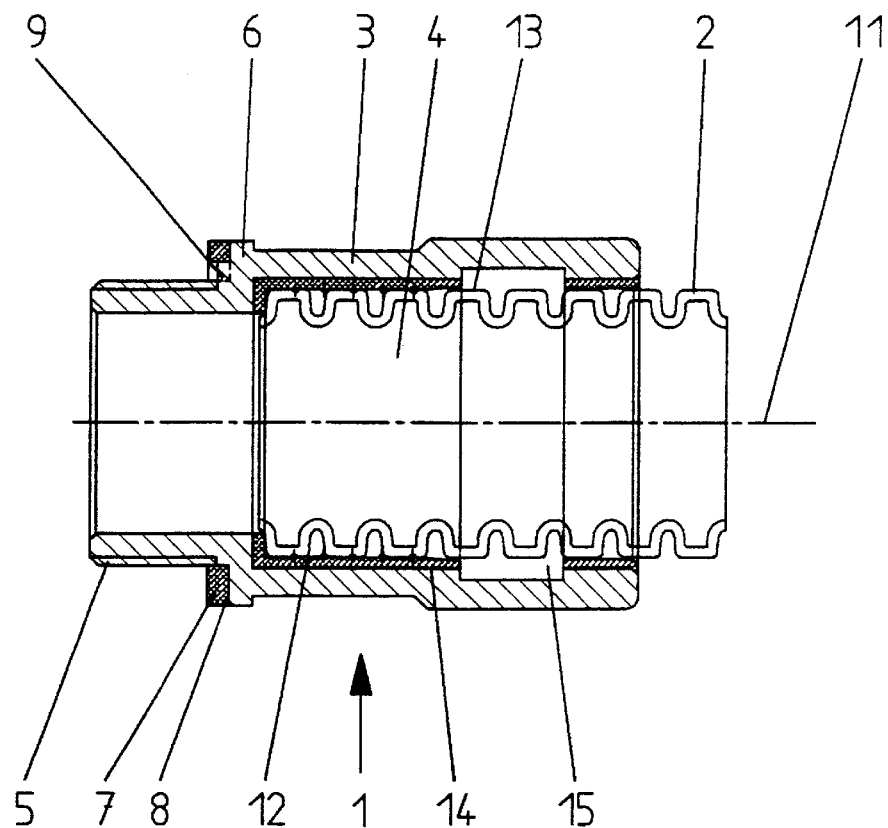
FIG. 1 a longitudinal cross-section through a joining and connecting element according to the invention, and FIG. 2 the view of the joining element according to FIG. 1 from the side of the threaded stub.

FIG. 1 shows a longitudinal cross-section through a joining and connecting element 1 for corrugated pipes 2, wherein one end of the corrugated pipe 2 is shown schematically. This end of the corrugated pipe 2 is slid into a hollow core space 4 of a housing 3 of the connecting element 1, and is held there by locking elements (not shown) known per se. This locking element is introduced radially into a recess 15 on the housing 3 and engages with locking ribs the wave valleys on the corrugated pipe 2. This is thereby held in the housing 3 and locked against being pulled out. Such a locking element is described, for example, in Swiss Patent CH 645 448. On the housing 3 at the end, facing away in the direction of the longitudinal axis 11, from the hollow core space 4, is disposed a connecting portion 5 which in the example depicted is structured as a threaded stub with outer threading. Adjoining this threaded stub 5 is an abutment shoulder 6 with a sealing face 8. With this sealing face 8 is fixedly connected a substantially annular seal 7. The housing 3 is comprised of a synthetic material and is produced by injection molding with a polyamide being used as the material. In a second process step the seal 7 is formed onto the housing 3 such that the desired tight connection is obtained between seal 7 and sealing face 8. As the material in the described example is used a polyester elastomer but all other synthetic materials used for such seals can also be applied. On the abutment shoulder 6 staying elements 9 and 10 are disposed on the sealing face 8, which are formed directly onto the housing 3 and, therefore, comprise polyamide. In the direction of longitudinal axis 11 these staying elements 9, 10 are of a lesser height than the thickness of seal 7. For this reason, the seal 7 initially projects above the staying elements 9, 10 and can be compressed. In the radial direction the staying elements are also smaller than the width of the seal 7 or of the sealing face 8, such that the seal 7 is closed in the form of a ring. When the connecting element 1 with the threaded stub 5 is screwed into a threaded bore, the pressing forces are absorbed by the staying elements 9 and 10 and not by the seal 7. The material of seal 7 can thus be optimally matched to the sealing purpose and a better and more secure sealing effect is obtained.

In the hollow core space 4 of housing 3 a seal 12 is also disposed which forms a portion of a sealing configuration between corrugated pipe 2 and housing 3. This seal 12 is fixedly connected via its outer shell with the inner shell 14 of the hollow core space 4 on the housing 3. This fixed connection is also generated in a second process step by injecting seal 12 into housing 3. As the material for seal 12 a polyester elastomer is also used. With the aid of this seal 12 fixedly connected with housing 3 a tight connection is formed between the outer shell 13 of the corrugated pipe 2 which, for example, meets the requirements of Standard EN 60529 with respect to water. When sliding the end of pipe 2 in or pulling it out, this seal 12 cannot be pulled out of the housing 3 or cannot be deformed into the housing. Therewith, the sealing effect is always ensured and no additional emplacement of the seal 12 need to be carried out when connecting the corrugated pipe 2 with the housing 3 of the connecting element 1. This represents a considerable simplification of the connecting process and increases the reliability of the sealing connection.

Figure 2:
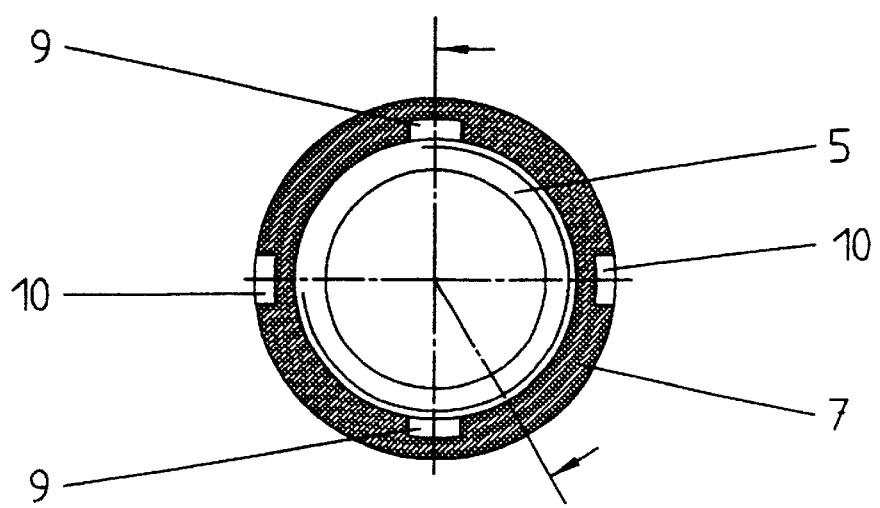

FIG. 2 shows a view of the connecting element 1 in the direction of the connecting portion 5. Therein the staying elements 9 and 10 are disposed offset in pairs. The two staying elements 9, which oppose one another diametrically, are disposed on the inner diameter of the abutment shoulder 6 or of the sealing face 8. The two staying elements 10 also oppose one another diametrically, they are, however, disposed on the outer diameter of the abutment shoulder 6 and thus of the sealing face 8. The two staying elements 10 are disposed between the two staying elements 9 in the direction of the circumference, such that an angle of spacing between the staying elements 9 and 10 of 90° results. This configuration yields a uniform distribution of the pressing forces and, simultaneously, a secure contact. As a function of the magnitude of the pressing forces, a greater number of staying elements 9 and 10 or a different configuration or larger elements can also be used. In FIG. 2 is evident that, in spite of the staying elements 9 and 10, the seal 7 encompasses annularly the threaded stub or the connecting portion 5 in the manner of a ring.

What is claimed is:

1. Joining and connecting element (1) for corrugated pipes (2) with at least one hollow core space (4) encompassed by a housing (3) for receiving a pipe end, a connecting portion (5) on the end of the housing (3) facing away from the hollow core space (4), an abutment shoulder (6) developed in the region of the connecting portion (5) on the housing (3) with a sealing face (8), and a sealing configuration, characterized in that a seal (7) of the sealing configuration is fixedly connected with the sealing face (8), directed toward the connecting portion (5), of the abutment shoulder (6), that at this sealing face (8) on the housing (3) are structured at least two staying elements (9, 10), that these staying elements (9, 10) have a width in the radial direction which is less than the width of the seal (7), and that the height of these staying elements (9, 10) in the direction of the longitudinal axis (11) of the housing is less than the thickness of the seal (7).

2. Joining and connecting element as claimed in claim 1, characterized in that in the hollow core space (4) of the housing (3) a second seal (12), in the form of a sleeve, is fixedly connected with the housing (3), and this seal (12), with the end of the corrugated pipe (2) being slid in, is being disposed between an outer shell (13) of the corrugated pipe (2) and an inner shell (14) of the hollow core space (4).

3. Joining and connecting element as claimed in claim 1, characterized in that the seal (7, 12) is comprised of a synthetic material and the fixed connection between the housing (3) and the seal (7, 12) is formed on the contact faces by surface bonding and the fixedly-connected unit comprised of housing (3) and seal (7, 12), is a two-component injection molded part.

4. Joining and connecting element as claimed in claim 1, characterized in that two staying elements (10) are disposed diametrically opposing one another and are each disposed on the outer diameter of the abutment shoulder (6) and two further staying elements (9) on the inner diameter of the abutment shoulder (6), and one of each is structured between the other staying elements (10).

5. Joining and connecting element as claimed in claim 1, characterized in that the housing (3) is comprised of metal or of polyamide or of metal and polyamide.

* * * * *